US00RE50897E

(19) United States
(12) Reissued Patent
Newar et al.

(10) Patent Number: US RE50,897 E
(45) Date of Reissued Patent: May 26, 2026

(54) FORGING PRESS FOR HOT FORGING OF ASYMMETRIC TO SYMMETRIC RAIL AND PROCESS OF FORGING THEREOF

(71) Applicants: Savita Newar, Kolkata (IN); Shyam Newar, Kolkata (IN)

(72) Inventors: Savita Newar, Kolkata (IN); Shyam Newar, Kolkata (IN)

(73) Assignees: Savita Nowar, Kolkata (IN); Shyam Newar, Kolkata (IN)

(21) Appl. No.: 18/634,396

(22) Filed: Apr. 12, 2024

Related U.S. Patent Documents

Reissue of:
(64) Patent No.: 11,925,966
Issued: Mar. 12, 2024
Appl. No.: 17/839,883
Filed: Jun. 14, 2022

U.S. Applications:
(63) Continuation-in-part of application No. PCT/IN2021/051109, filed on Nov. 27, 2021.

(30) Foreign Application Priority Data

Dec. 5, 2020 (IN) ..... 202031053044

(51) Int. Cl.

| | |
|---|---|
| ***B21B 1/085*** | (2006.01) |
| ***B21B 35/00*** | (2006.01) |
| ***B21B 45/00*** | (2006.01) |
| ***B21J 1/06*** | (2006.01) |
| ***B21J 5/00*** | (2006.01) |
| ***B21J 9/02*** | (2006.01) |

(Continued)

(52) U.S. Cl.
CPC ..... *B21B 1/0855* (2013.01); *B21B 45/004* (2013.01); *B21J 1/06* (2013.01); *B21J 5/008* (2013.01); *B21J 9/022* (2013.01); *B21J 9/025* (2013.01); *B21J 9/12* (2013.01); *B21J 13/025* (2013.01); *B21K 29/00* (2013.01); *B21B 2035/005* (2013.01); *B21B 2201/16* (2013.01)

(58) Field of Classification Search
CPC ..... B21B 1/0855; B21B 45/004; B21B 2035/005; B21B 2201/16; B21J 9/025; B21J 9/12; B21J 5/00; B21J 5/008; B21J 9/022; B21J 12/025; B21J 1/06; B21K 29/00
See application file for complete search history.

(56) References Cited

U.S. PATENT DOCUMENTS 4,192,172 A * 3/1980 Mersek ..... B21J 13/08 72/422
4,291,566 A * 9/1981 Dinsdale ..... B21J 9/08 29/402.21

(Continued)

FOREIGN PATENT DOCUMENTS

CN 104550593 1/2017
CN 107142367 1/2017

*Primary Examiner* — William C Doerrler
(74) *Attorney, Agent, or Firm* — Dominic Frisina

(57) ABSTRACT

A forge and method of forging is provided. The forge converts an asymmetric railroad rail to a symmetric railroad rail through a combination of vertical and horizontal forging operations. The rail is linearly translated to heating and forging stations on a roller table. The asymmetric to symmetric conversion can be completed without the need for reorienting the rail except along a single translational axis.

14 Claims, 10 Drawing Sheets

(51) Int. Cl.

| | |
|---|---|
| ***B21J 9/12*** | (2006.01) |
| ***B21J 13/02*** | (2006.01) |
| ***B21K 29/00*** | (2006.01) |

(56) References Cited

U.S. PATENT DOCUMENTS

| | | | | | |
|---|---|---|---|---|---|
| 4,407,056 | A * | 10/1983 | Watanabe | B21J 5/00 | 72/190 |
| 4,907,436 | A * | 3/1990 | Korytko | B21J 9/02 | 72/207 |
| 5,272,896 | A * | 12/1993 | Mine | B21J 9/00 | 29/33 P |
| 2015/0013421 | A1* | 1/2015 | Choda et al. | B21J 13/03 | 72/342.8 |
| 2015/0217348 | A1* | 8/2015 | Kenjale | B21B 1/0855 | 29/412 |
| 2021/0101203 | A1* | 4/2021 | Newar | B21J 13/03 | |

* cited by examiner

PRIOR ART
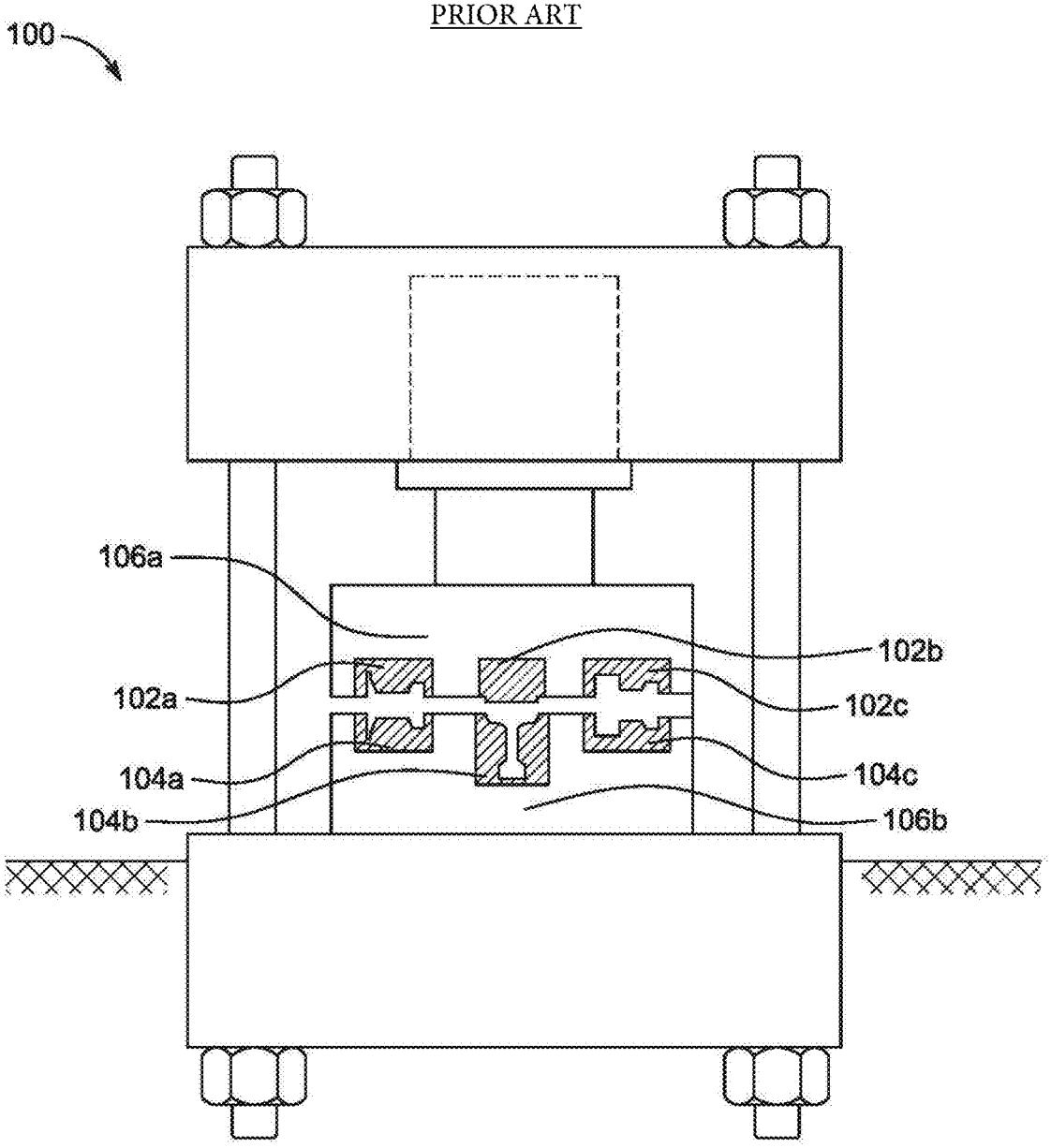
FIG. 1
AMENDED

"A - A"

"C - C"

"B - B"

"C - C"

FORGING PRESS FOR HOT FORGING OF ASYMMETRIC TO SYMMETRIC RAIL AND PROCESS OF FORGING THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a continuation-in-part of pending International Application No. PCT/IN2021/051109 filed Nov. 27, 2021, which claims priority to Indian Patent Application No. 202031053044 filed Dec. 5, 2020 and hereby incorporates both applications by reference in their entireties.

FIELD OF THE INVENTION

The present invention relates to a forging machine for progressive hot end-forging of asymmetric to symmetric rail and a process of hot end-forging of asymmetric to symmetric rail.

BACKGROUND OF THE INVENTION

Forging is a method of deforming steel in a heated condition to a predetermined shape using a hammering or pressing method. Hydraulic pressing systems can be categorized generally as either (a) open die or (b) close die. In open die systems, a heated metal blank is pressed between two steel plates or die. Normally, a bottom platen is fixed and the top platen is movable. Pressing is done by means of a double acting hydraulic cylinder. In closed die forging, the heated metal blank is placed in a die resembling a mold, which confines the metal work piece to the die and causes it to take on the shape of the die.

The state of the art is to heat a rail in a heater and conduct three consecutive forging operations as shown in FIG. 1. According to the state of the art, a forge 100 presses a top dies 102a, 102b, and 102c moving along a vertical axis only. The bottom dies 104a, 104b, and 104c is stationary. At present, all three forging operations are carried out on a hydraulic press fitted with a die block 106a, 106b in which all three pairs of dies are fitted side by side and a rail is shifted and rotated as per the configuration and orientation of the dies. The shifting, rotation and positioning of the rail are carried out by manipulators. The manipulator has to be fast and accurate so that time is not wasted, which would result in cooling of the rails.

In order to make the process faster, cost effective, and to decrease rejection rate, embodiments of the present invention provide a combination of hydraulic presses and an unique press configuration for end-forging of asymmetric rail to symmetric rail, as well as a novel end-forging manufacturing process. Symmetric rail is regularly used by Railway Authorities.

SUMMARY OF THE INVENTION

The present invention provides an asymmetric to symmetric rail forging press, comprising: a roller table (209) having one translational axis, the roller table being adapted to receive a railroad rail (210) and translate a railroad rail fore and aft along the one translational axis; an induction heater (208) adapted to receive an end portion of a railroad rail, the induction heater being laterally movable between a working position in line with a railroad rail, and a home position not in line with the railroad rail; a first forging station in line with the roller table (209) and adapted to receive a railroad rail therefrom, the first forging station comprising a first pair of opposing horizontal hydraulic cylinders (206a, 206b) having horizontal strokes and driving a first set of horizontal forging dies (219), and a first top hydraulic cylinder (211) having a vertical stroke, the first top hydraulic cylinder being aligned to vertically impinge on the first set of horizontal forging dies during a horizontal forging operation, and the first forging station further including two clamps spaced apart along the length of a railroad rail and adapted to fix the position of a railroad rail during a forging operation; a second forging station in line with the roller table (209) and adapted to receive a railroad rail from the first forging station, the second forging station comprising, a second pair of opposing horizontal hydraulic cylinders (207a, 207b) having horizontal strokes and driving a second set of horizontal forging dies (218), and a second top hydraulic cylinder (201) having a vertical stroke and driving a top die (323), and the second forging station further including a clamp adapted to receive an end of a railroad rail and fix the position of a railroad rail during a forging operation; and the top die (323) being linearly translatable between two working positions corresponding to a first portion (323a) of the top die and a second portion (323b) of the top die, wherein the first portion (323a) of the top die includes a lateral step (423) running the length of the first portion (323a), and wherein the second portion (323b) of the top die is flat, omitting the lateral step (423).

The invention further provides a process for asymmetric to symmetric rail forging comprising the steps of: mounting a rail to a roller table in line with a first forging station, the roller table being adapted to drive the rail along one translational axis; positioning an induction heater between the roller table and the first forging station; driving the rail into inductive communication with the induction heater; inductively heating the rail to a predetermined forging temperature; driving the rail to a first forging station; clamping the rail at ends of a working section of the rail; pressing a first set of horizontal forging dies into a head portion of the rail and into a first section of the web portion of the rail; translationally driving a set of add-on dies to a position stacked vertically on the first set of horizontal dies; pressing the first set of horizontal forging dies and the add-on dies into the head portion of the rail, the first section of the web portion of the rail, and a second section of the web portion of the rail; driving the rail to a second forging station; clamping the rail at three points including an end of the rail, a middle portion of the rail and an unworked portion of the rail; pressing a second set of horizontal forging dies into the head portion and the web portion; pressing a first portion of a top die, from a first position, into a foot of the rail; translationally driving the top die from the first position to a second position; and pressing a second portion of the top die into the foot of the rail.

Other benefits and advantages will become apparent to those skilled in the art to which it pertains upon reading and understanding of the following detailed specification.

BRIEF DESCRIPTION OF THE ACCOMPANYING DRAWINGS

The invention may take physical form in certain parts and arrangement of parts, embodiments of which will be described in detail in this specification and illustrated in the accompanying drawings which form a part hereof, wherein like reference numerals indicate like structure, and wherein:

FIG. 1 depicts a conventional rail forging machine available in the market;

DETAILED DESCRIPTION OF THE PREFERRED EMBODIMENT

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Terms of degree, terms of approximation, and/or subjective terms may be used herein to describe certain features or elements of the invention. In each case sufficient disclosure is provided to inform the person having ordinary skill in the art in accordance with the written description requirement and the definiteness requirement of 35 U.S.C. 112.

One embodiment of the present invention is a forge configured for hot end-forging asymmetric rail to symmetric rail.

Figure 2:
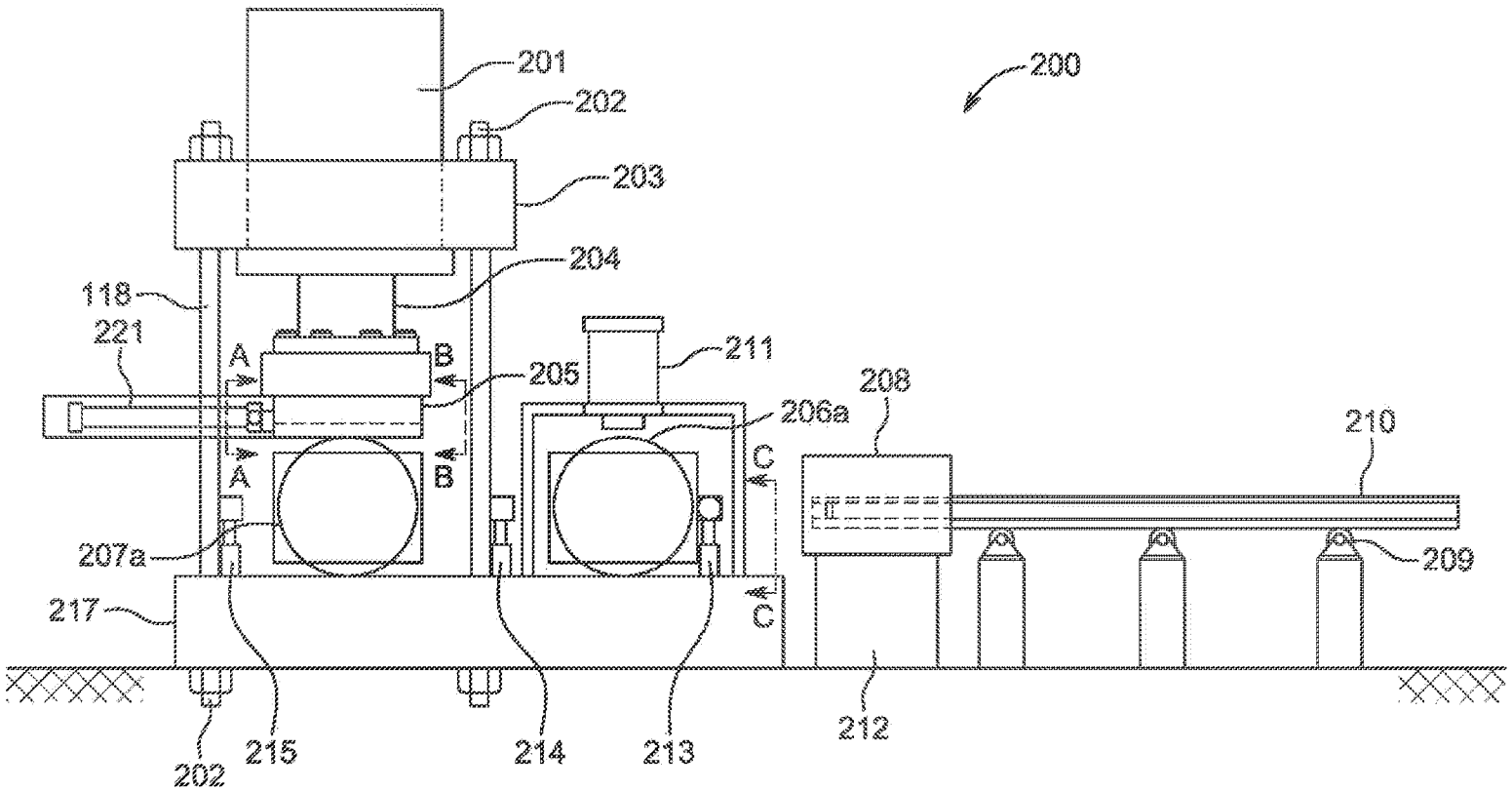
FIG. 2 is an overall view of an embodiment for hot end-forging of asymmetric rail to symmetric rail.
Figure 3:
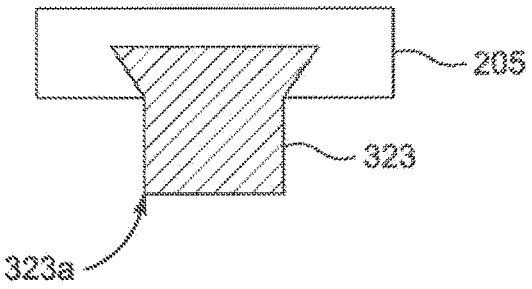
FIG. 3 is a view of FIG. 2 along line A-A.

Some embodiments include a two forging positions and an in-line heater arranged such that a rail moves from the heater to the first forging position, and then to the second forging position along the same line. Such embodiments eliminate the need for manipulators to reorient the rail. As shown in FIG. 2, the embodiment requires no rotation of the rail work piece. Eliminating the need for rotating the work piece also saves time, and therefore reduces heat loss from the work piece.

With continuing reference to FIG. 2, a hydraulic forging press according to one embodiment 200 has a first pair of opposing side hydraulic cylinders 206a, 206b (206b is out of view). A first top hydraulic cylinder 211 is shown positioned above the first set of horizontal hydraulic cylinders 206a, 206b. Together, the horizontal hydraulic cylinders 206a, 206b and the top hydraulic cylinder 211 form a first forging station, corresponding to a first forging position of a rail. The press further comprises a second pair of opposing side hydraulic cylinders 207a, 207b (207b is out of view). A second top hydraulic cylinder 201 is shown positioned above the second set of horizontal hydraulic cylinders 207a, 207b. Together, the second set of horizontal hydraulic cylinders 207a, 207b and the second top hydraulic cylinder 201 form a second forging station, corresponding to a second forging position of a rail.

Figure 6A:
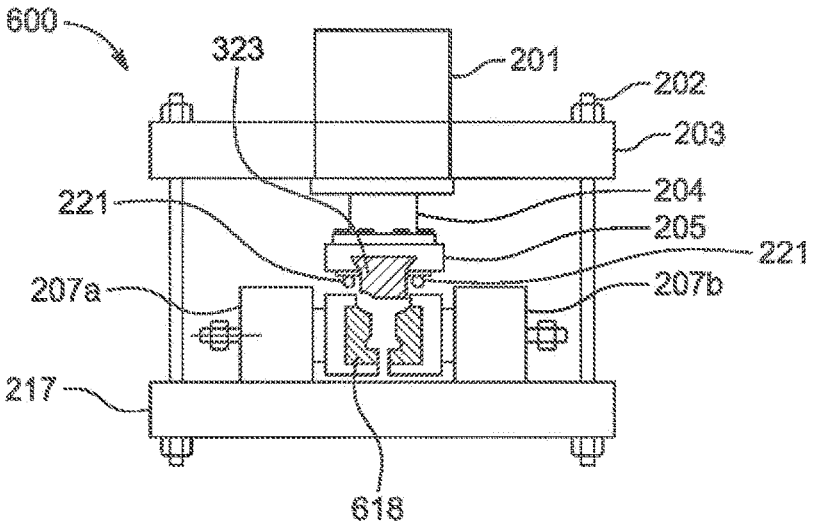
FIG. 6A shows a forge according to an embodiment of the invention.

With regard to the second top hydraulic cylinder 201, FIG. 6A shows that it is fitted with a movable die 323.

In another embodiment, the die is closed providing forging forces acting on all the surfaces of the rail simultaneously, and resulting in a dimensionally accurate product.

In another embodiment, pre-cutting an end portion of a rail through the foot and partway through the web provides structure suitable for receiving a clamp 215, which leads to improved straightness of the rail after forging.

In another embodiment, the induction heater 208 and the first and second forging stations are arranged such that a rail 210 can be shifted in a line along the length of the rail 210 from the heater 208 to each station. The first forging station comprises horizontal hydraulic cylinders 206a, 206b, and vertical cylinder 211. The second station comprises horizontal cylinders 207a and 207b, and vertical cylinder 201. After carrying out a first forging operation at a the first station, vertical cylinder 211 impinges the horizontal die or die housing driven by horizontal cylinders 206a, 206b to disengage the die from the work piece, thus preventing lap formation. Then the partly forged rail 210 is shifted to the second forging station to carry out the next forging operation. The partially forged rails remain in this second location for subsequent forging operations on the rail foot involving the top cylinder 201 and a linearly translatable top die 323. Unlike the first station, the second forging station includes a top die 323 that is linearly translatable along an axis in line with the rail 210. This allows different portions of the top die to engage a work piece by translating the top die along a linear axis.

With reference to FIG. 2, the second forging station comprises a rigid top frame 203 and a rigid bottom frame 217 connected by four tie rods 118 with nuts 202 at the top frame 203 and the bottom frame 217. The top frame 203 is fitted with a top cylinder 201 having a piston rod 204 for a downward vertical stroke. A top die housing 205 of the piston rod 204 is linearly translatable between two working positions for progressive forging of the rail foot. The die housing 205 is translated along an axis in line with the rail 210 using hydraulic cylinders 221.

Turning to FIG. 6A, the second station 600 of the rail forging press 200 has two horizontal side cylinders 207a, 207b mounted on suitable frames to provide horizontal force on the rail 210 from both sides. The side cylinders 207a, 207b are fitted with suitable dies 618 as shown in FIGS. 6A-6C. A hydraulically operated clamp 215 (See FIGS. 2, 5(a), and 5(b)) is provided at one end to restrict sidewise bending of the rail.

In contrast to the first forging station, which consist of a pair of side cylinders, 206a and 206b, and a top cylinder 211 having only a vertical axis of motion (FIG. 2), the second station comprises movable cylinders 221 for displacing the top die 323 along an axis in-line with the rail 210.

In another embodiment an induction heater 208 for heating the rail 210 is mounted on a laterally movable stand 212, which for example and without limitation, may be hydraulically operated. The rail 210 is advanced fore and aft along a single translational axis using a servo motor-driven roller table 209 fitted with proximity switches for accurate linear positioning of the rail 210. The induction heater 208 can be moved inline between the rail 210 and the first and second forge stations when heating is required, and moved away when heating is complete. The rail 210 can be accurately driven forward by the servo table 209 into the induction heater 208 to a predetermined location. After reaching required temperature the rail 210 can be driven aft by the roller table 209, withdrawing it from the induction heater 208. The induction heater 208 can then be laterally driven back to its home position. The rail 210 is again driven forward by the roller table 209, accurately positioning it inside the forge without the need for rotating the rail 210, or moving the rail 210 in any direction other than fore and aft.

Figure 10:
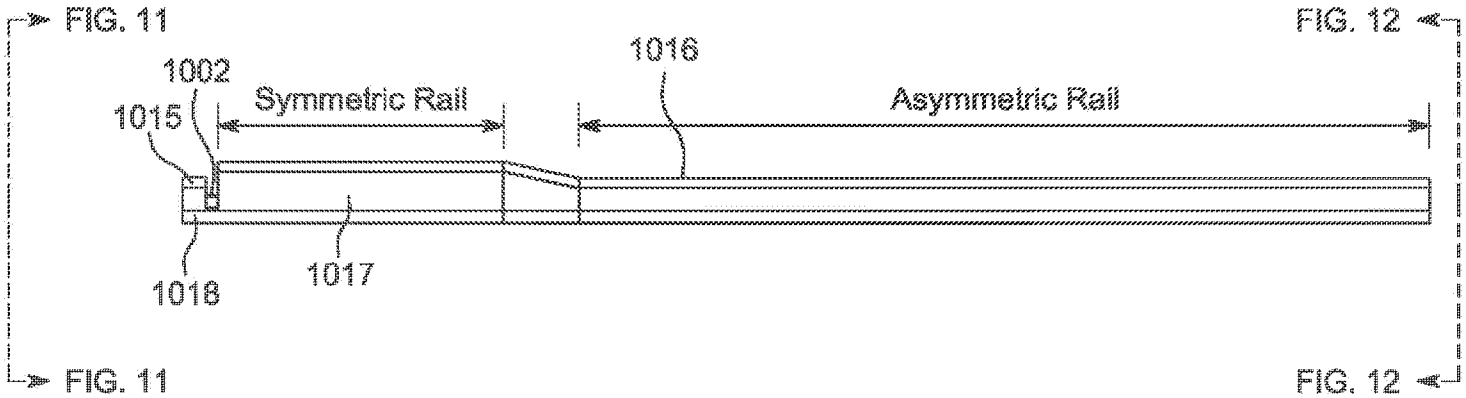
FIG. 10 shows a product of a forging process according to an embodiment of the invention.
Figure 12:
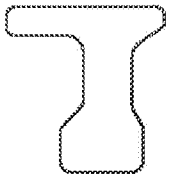
FIG. 12 is a longitudinal view of rail 210 in the direction indicated by line FIG. 12-FIG. 12 in FIG. 10.

A process according to an embodiment of the invention comprises the following steps. A 20 mm wide slot 1002 is cut 80 mm from one end of a rail to a height of 80 mm from the rail foot 1016 as shown in FIG. 10. This forms end portion 1015. Later in the process, the slot 1002 and end portion 1015 are used for clamping the rail 210 using hydraulic clamp 215. Clamping in this manner keeps the rail 210 straight during forging thereby preventing the rail from bending, which would result in rejection of the part. When forging is complete, the end portion can be cut off and discarded.

Figure 5A:
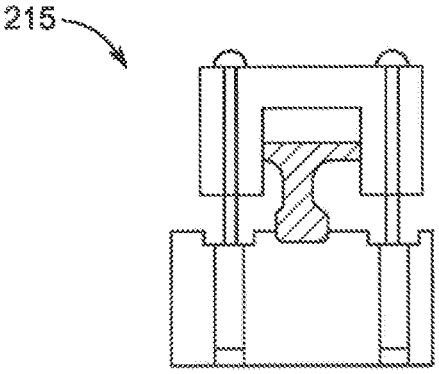
FIG. 5(a) is a view of FIG. 2 along line C-C showing a clamping mechanism of the embodiment in a disengaged position.
Figure 4:
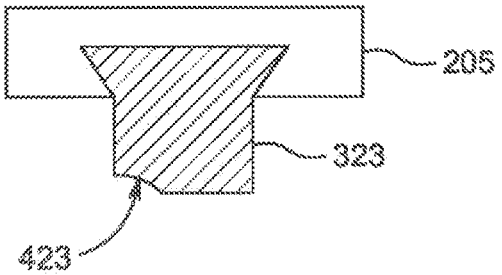
FIG. 4 is a view of FIG. 2 along line B-B.
Figure 5B:
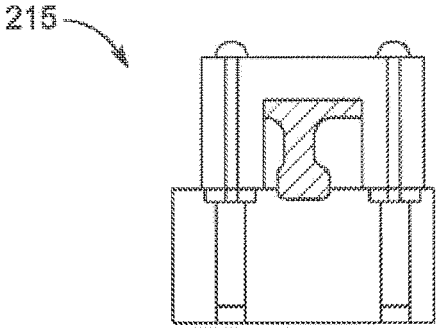
FIG. 5(b) is the same view as FIG. 5(a) except that the clamping mechanism is in an engaged position, clamping a rail.
Figure 6B:
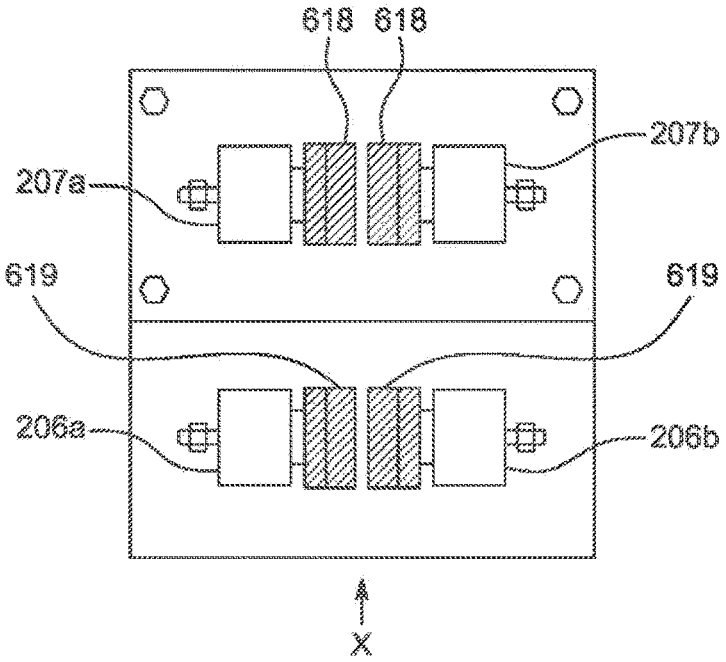
FIG. 6B is a top view of the horizontal forge element of FIG. 6A plus a second horizontal forge element.
Figure 6C:
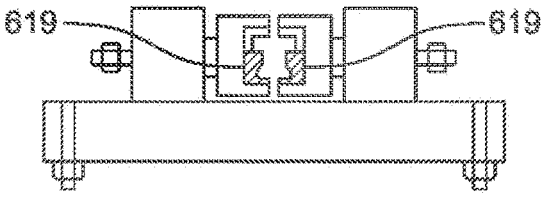
FIG. 6C is a side view of the second horizontal forge element shown in FIG. 6B.

The process further includes the step of mounting the rail 210 to a movable servo-motor-controlled roller table 209 in an inverted orientation, with the head facing down (see e.g. FIGS. 5(a) and 5(b)). The table is equipped with elements for sensing the rail's position, such elements being well-known in the art, so that the table knows certain positions that are necessary for performing processes according to embodiments of the invention. Such positions including, without limitation, a position corresponding to the induction heater 208, a position corresponding to the first and second forging stations, and neutral home position outside of the heater 208 and the forge.

The process further includes the induction heater 208 being moved to a position in-line between the rail 210 and the forge. The roller table 209 drives the rail 210 forward to a predetermined position corresponding to the interior of the induction heater 208, and the rail 210 is held in this position until a temperature reading indicates that the rail 210 is properly heated for forging, typically about 1180° C. The roller table 209 then withdraws the rail 210, for example to the home position, and the induction heater is moved from between the rail 210 and the forge.

Figure 8A:
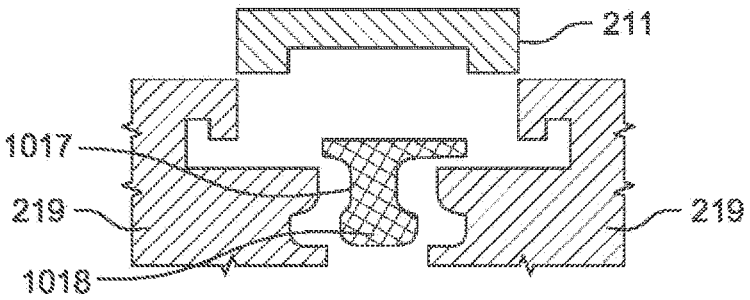
FIG. 8A shows a first step in a process of hot end-forging a rail head and rail web according to an embodiment of the invention.
Figure 8B:
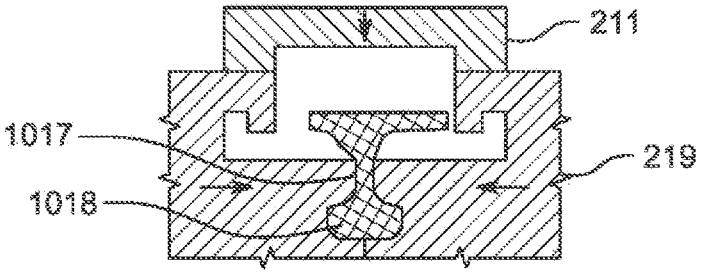
FIG. 8B shows a second step in a process of hot end-forging a rail head and rail web according to an embodiment of the invention.

The process further includes the roller table 209 driving the rail forward to a second predetermined position corresponding to the first forging station. Clamps 13 and 14 are applied to the rail 210 being forged thereby preventing lateral bending of the rail 210. With reference to FIG. 8A, the first pair of horizontal hydraulic cylinders 206a, 206b laterally apply die 219 to the head 1018 of the rail 210 and to a section of the web 1017. As shown in FIG. 8B, the operation illustrated in FIG. 8A results in a symmetric rail head 1018 and causes the web 1017 to become thinner and taller. In FIG. 8B, cylinder 211 is shown in contact with die 219 to prevent movement that may cause lapping.

Figure 8C:
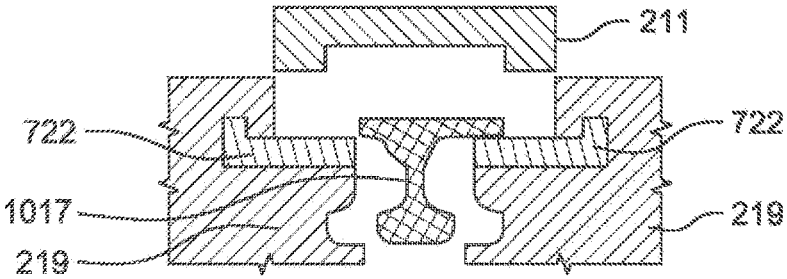
FIG. 8C shows a third step in a process of hot end-forging a rail head and rail web according to an embodiment of the invention.
Figure 8D:
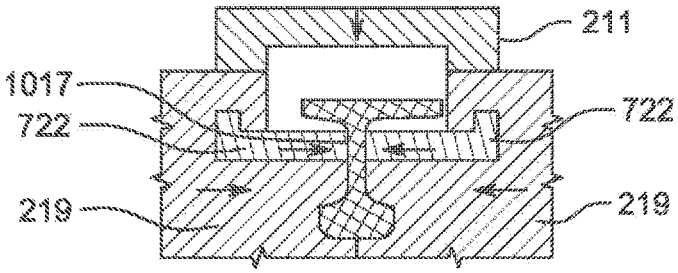
FIG. 8D shows a fourth step in a process of hot end-forging a rail head and rail web according to an embodiment of the invention.

In FIG. 8C, the die 219 is opened and add-on die 722 is placed in a forging position. In FIG. 8D, the die 219 and add-on die 722 are then driven into the rail head 1018 and rail web 1017, including a portion of the web 1017 not accessible by the die 219 alone. Add-on dies 722 ensure reaching a required web height without limiting reduction of the rail 210 web. This helps to limit rejection of rails due to web over-thinning or lap formation. The die 219 is then opened again. The product of the forging operation illustrated in FIG. 8D is a fully formed symmetric head 1018 and web 1017; however, the foot 1016 requires further forging.

In an optional intermediate step, the rail 210 may be reheated by withdrawing it using the roller table 209, and moving the induction heater 208 back to the inline position. The roller table 209 then drives the rail 210 back into the induction heater 208, compensating for dissipated heat and bringing the rail back up to a forging temperature i.e., about 1150° C. The roller table then withdraws the rail 210 from the heater 208 and the heater is laterally moved back to its home position.

Figure 9A:
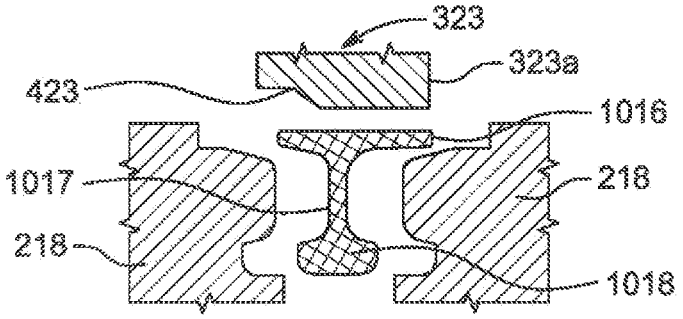
FIG. 9A shows first step in a process of hot end-forging a rail foot.
Figure 9B:
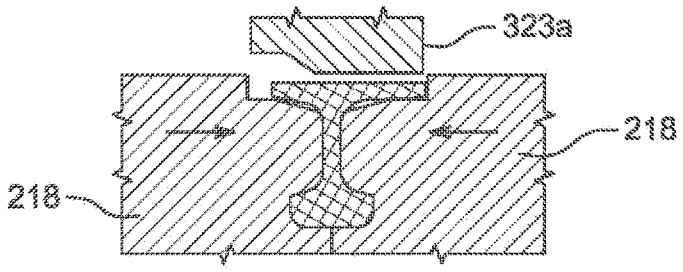
FIG. 9B shows second step in a process of hot end-forging a rail foot.
Figure 9C:
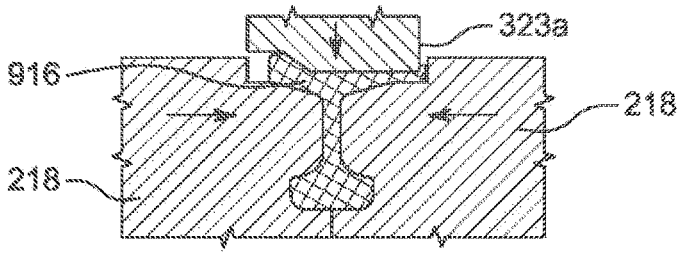
FIG. 9C shows third step in a process of hot end-forging a rail foot.
Figure 9D:
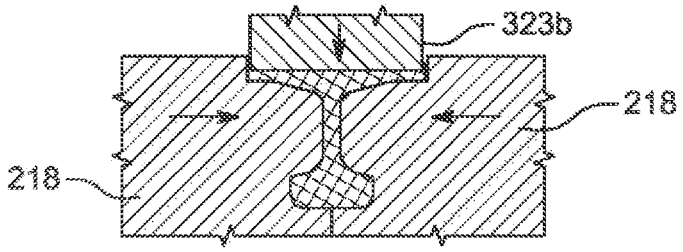
FIG. 9D shows fourth step in a process of hot end-forging a rail foot.

The rail 210 is advanced by the roller table 209 to the second forging station and clamped at three points with clamps 213, 214, and 215. With reference to FIGS. 9A and 9B, the horizontal die 218 is driven into the head 1018 and web 1017. The top die 323 is shown in a first position over the rail foot 1016. In the first position, a first portion 323a of the top die 323 is aligned with the foot 1016. The first portion 323a includes a lateral step 423 running the length of the first portion 323a. The lateral step 423 provides a space for the foot 1016 to laterally flow during forging. As shown in FIG. 9C, the first portion 323a of the top die 323 is hydraulically driven downward into the foot 1016, causing lateral flow 916. The top die 323 is then driven to a second position so that a second portion 323b of the top die is aligned with the foot 1016. The step 423 is omitted from the second portion 323b, thus providing a flat die surface for the final step of forming the foot 1016. The final forging operation is shown in FIG. 9D, where the second portion 323b is hydraulically driven downward into the foot 1016. Thus, the second portion 323b and the second set of horizontal dies 218 cooperate to form a geometrical profile of a finished symmetric rail section. All dies are then retracted and the rail 210 is withdrawn from the forge by roller table 209.

According to one embodiment the asymmetric rail forging press operations are controlled by a programmable logic controller having suitable safety interlocks. The forging process is operated through control desk equipped with a Supervisory Control and Data Acquisition (SCADA) system. Ample visualization and instrument data are displayed on the Human Machine Interface (HMI) screen.

Figure 11:
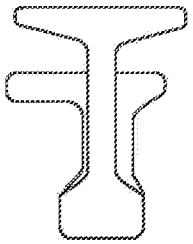
FIG. 11 is a longitudinal view of rail 210 in the direction indicated by line FIG. 11-FIG. 11 in FIG. 10.
Figure 13A:
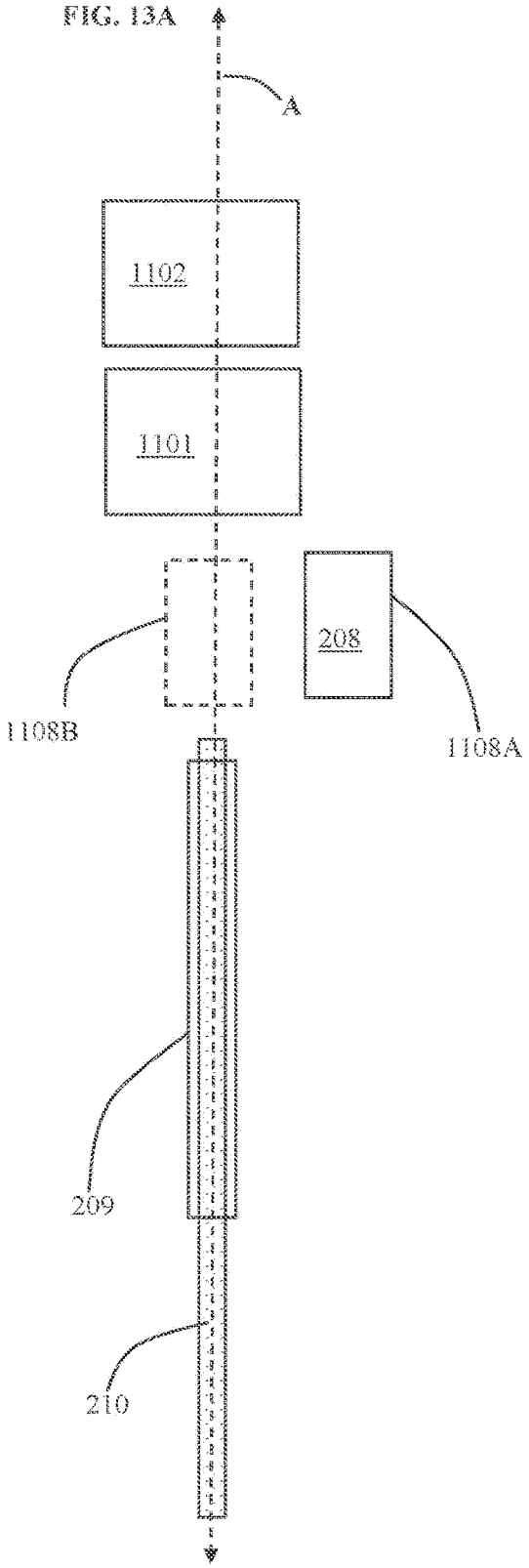
FIG. 13A is a schematic drawing showing the relative position of the first and second forging stations to an induction furnace in a home position and a rail in a home position.
Figure 13B:
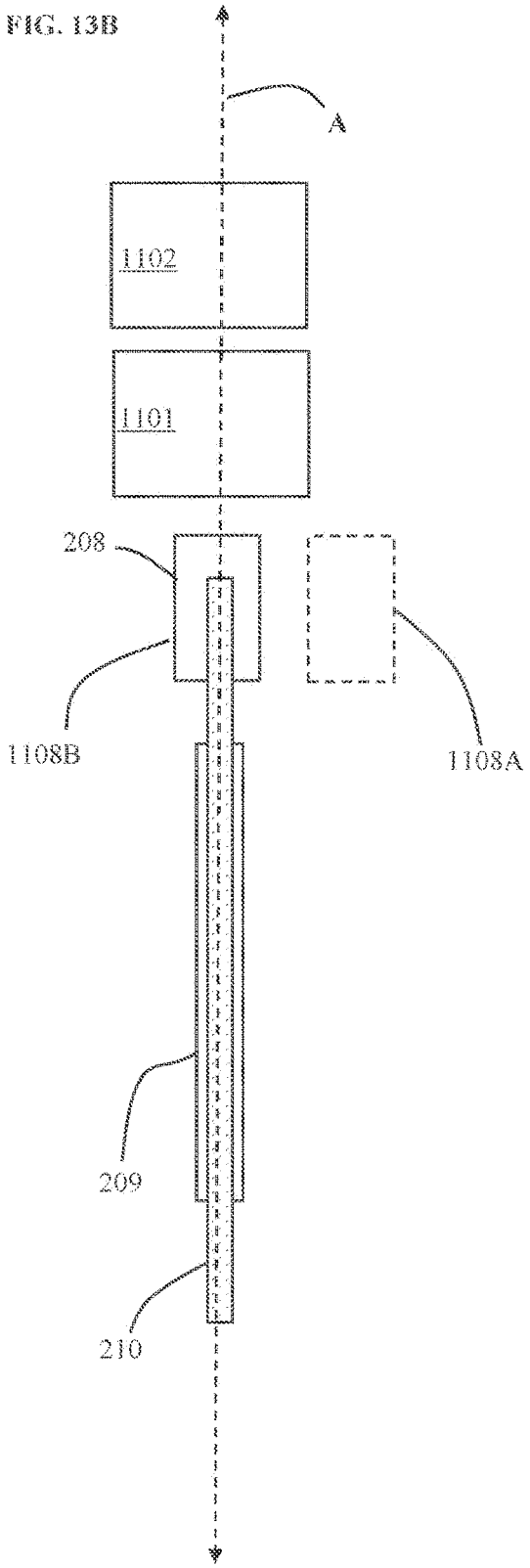
FIG. 13B is a schematic drawing showing the relative position of the first and second forging stations to an induction furnace in a working position and a rail positioned therein.
Figure 13C:
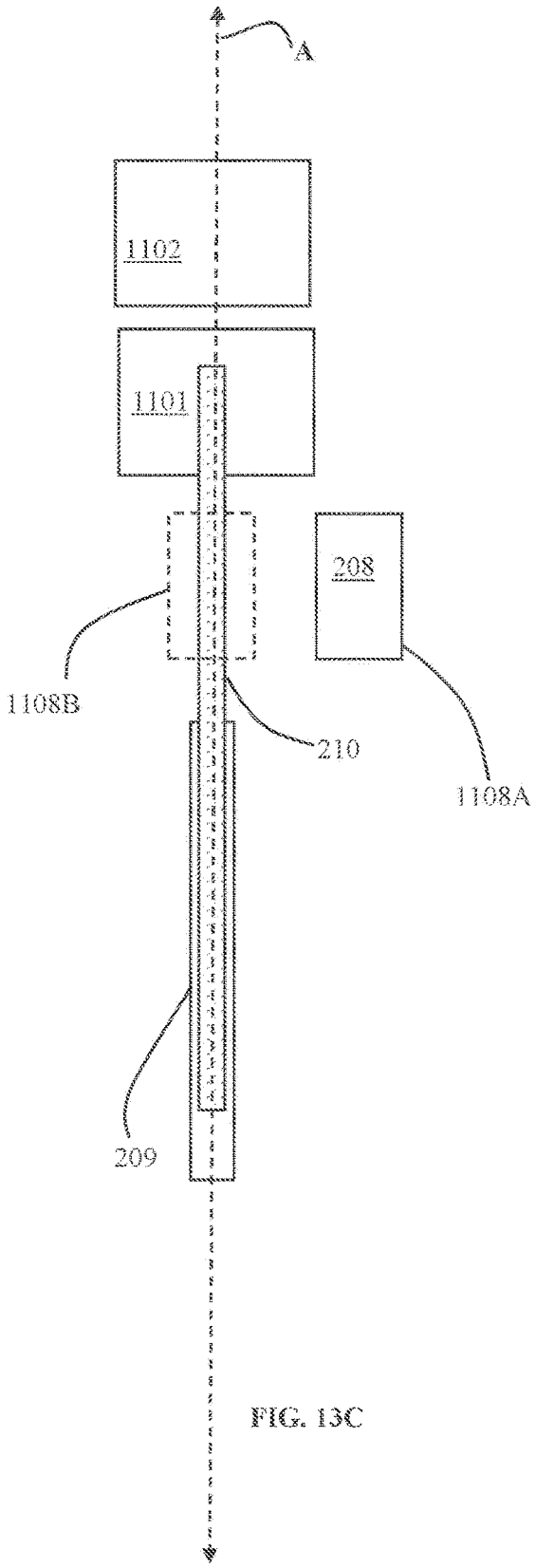
FIG. 13C is a schematic drawing showing the relative position of the first and second forging stations to an induction furnace in a home position and a rail in the first forging station.
Figure 13D:
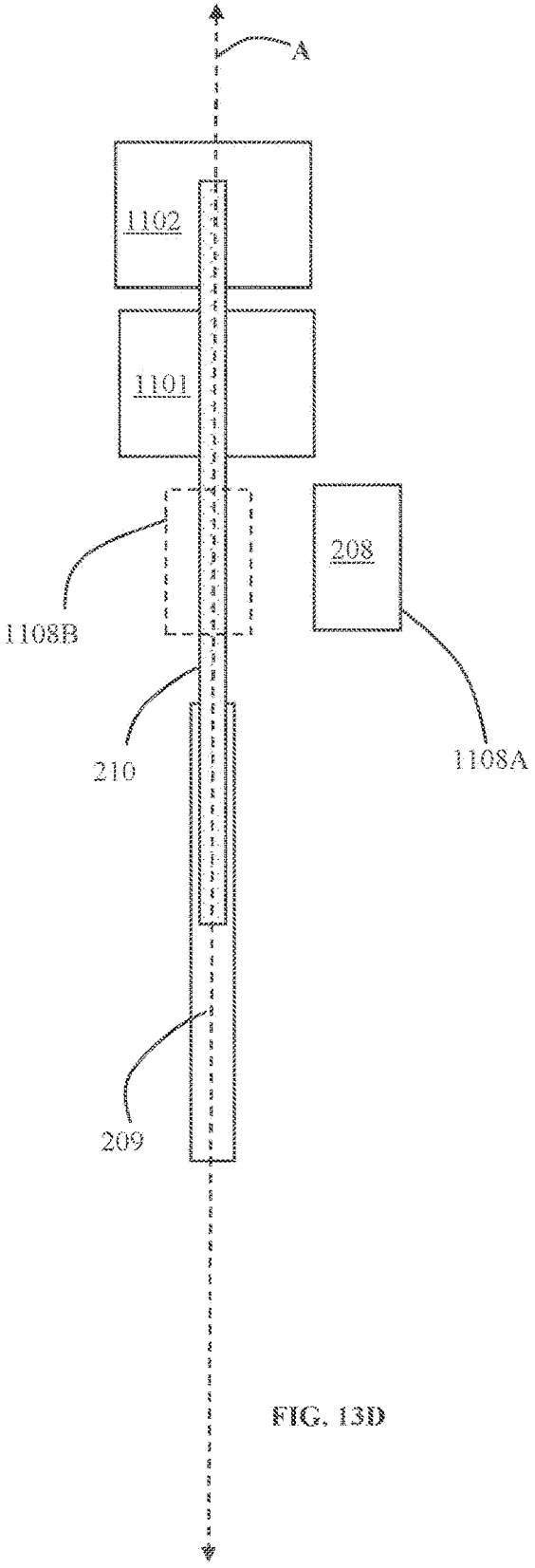
FIG. 13D is a schematic drawing showing the relative position of the first and second forging stations to an induction furnace in a home position and a rail in the second forging station.

According to one embodiment, a roller table 209 is adapted to receive a railroad rail 210, or similar work piece, and linearly position the rail along an axis. According to one embodiment, the rail may be inverted with the foot facing up and the head facing down; however, the invention is not limited to orientation. The roller table 209 is driven by a suitable means such as, without limitation, a servomotor. A starting position of the rail 210 may be considered a "home" position, as illustrated in FIG. 11A. The rail may be driven fore and aft by the servomotor as shown in FIGS. 11A-11D along an axis A. The embodiment includes a laterally movable induction heater 208 having at least two positions 1108A, 1108B. A home position 1108A is off axis A, out of the linear path of the rail 210. A working position 1108B is on axis A, in line with the rail 210. Accordingly, the induction heater can be moved, by any suitable known means, into the working position 1108B and the rail can be driven a predetermined distance by the roller table 209 corresponding to working position 1108B, and placing the rail 210 in inductive communication with the induction heater 208, as shown in FIG. 11B. When the rail is inductively heated to a suitable forging temperature e.g., 1150° C., the rail 210 can be withdrawn by the roller table 209 to a neutral position, e.g. as shown in FIG. 11A, and the induction heater 208 can be moved to its home position 1108A.

The rail is then driven to a first forging station 1101, as shown in FIG. 11C. The first forging station 1101 is in line with the roller table 209 on axis A and receives the rail 210 from the roller table 209. The station 1101 includes a first pair of opposing horizontal hydraulic cylinders 206a, 206b (see FIGS. 2 and 6B) having horizontal strokes. The hydraulic cylinders 206a, 206b include structure, such as die housings, receiving a first set of horizontal forging dies 219 (FIG. 6B). Accordingly, the cylinders 206a, 206b are adapted to drive the first set of horizontal forging dies 219 horizontally into a work piece to perform a forging operation. The first forging station 1101 also has a first top hydraulic cylinder 211 (see FIG. 2) having a vertical stroke. The first top hydraulic cylinder 211 is aligned to vertically impinge on the first set of horizontal forging dies 219 during a horizontal forging operation. As used here, impinging on the first set of horizontal dies 219 also includes impinging on a carrier or housing that holds the dies 219. Thus, the first top hydraulic cylinder 211 holds the dies 219 in place, or fixes their position, preventing movement that would otherwise cause defects in the work piece.

The first station 1101 also includes two clamps 213, 214 for holding the rail 210 during the forging operations. Suitable clamps are illustrated in FIGS. 5A and 5B and may be hydraulically driven. The clamps 213, 214 are also shown in context in FIG. 2. Clamp 213 engages the rail at a cold section, meaning a portion of the rail that it is not heated to forging temperature and/or is not intended to engage a die during the forging operation. As used herein, the term "cold section" is synonymous with "unworked portion". The length of rail between the clamps is referred to herein as a working section of the rail because it is the section being forged. Thus, the clamps 213, 214 engage the rail at ends of a working section. Clamp 214 engages the leading end of the rail, which may be cut or otherwise prepared to receive the clamp 214. Thus, the hydraulic clamps 213, 214 cooperate with the first top hydraulic cylinder 211 to fix the orientation of the work piece during forging and especially to prevent bending of the work piece.

The first horizontal forging dies 219 are shaped to form a closed die having the shape of the head 1018 and a portion of the web 1017 of a symmetric rail. When the die 219 is closed, i.e. pressed into the rail, the head 1018 is converted from asymmetric to symmetric and a portion of the web 1017 is thinned, increasing the height of the web. The balance of the web 1017, and the foot 1016, require further forging, which is handled in the next forging operation.

Figure 7:
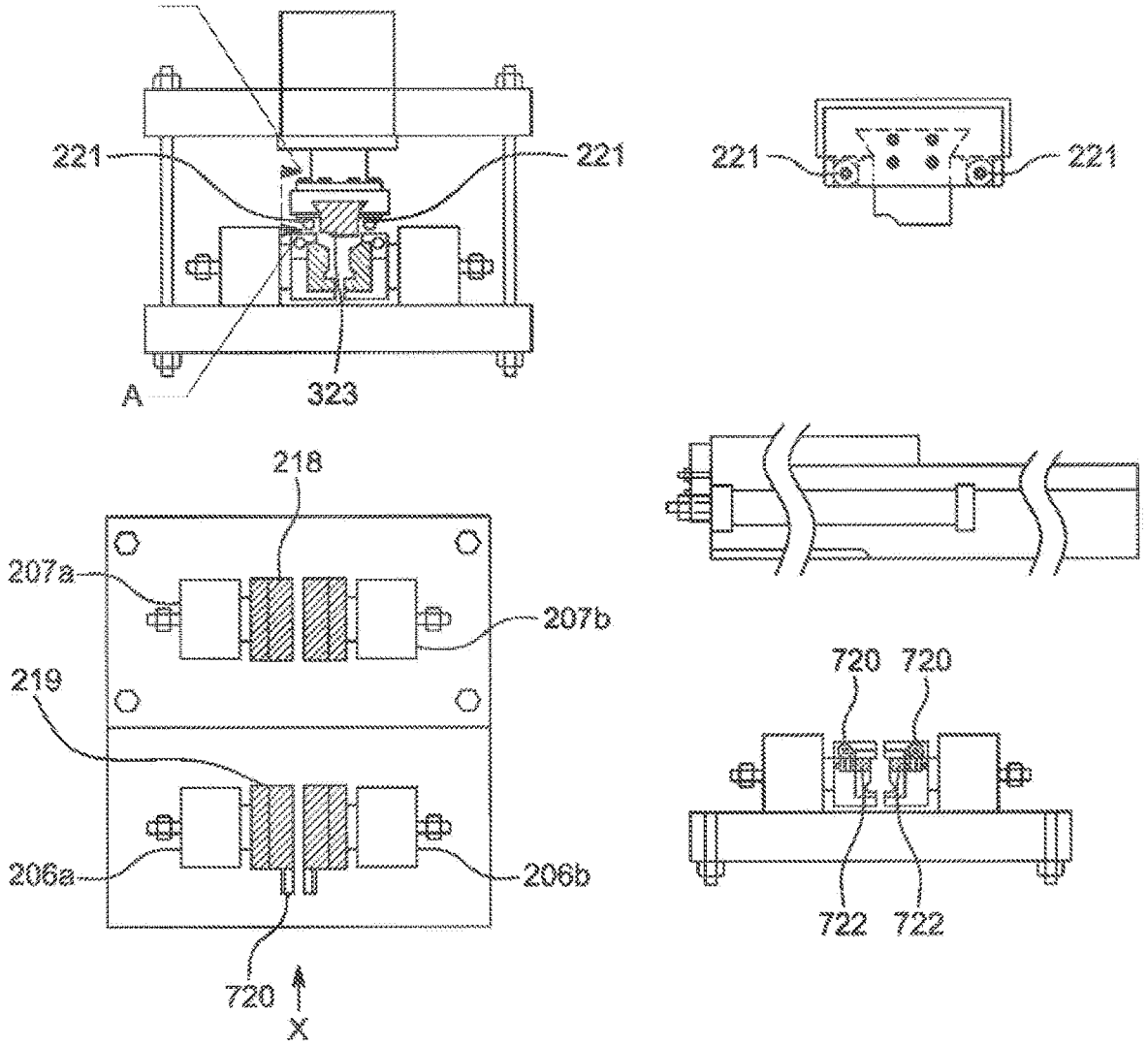
FIG. 7 shows machine for hot end-forging of asymmetric rail to symmetric rail.

Regarding the next forging operation, add-on dies 722 are translationally driven along axis A (FIGS. 11A-11D) from a home position to a working position. The add-on dies 722 may be driven from the home to the working position by any suitable known means, such as hydraulic means. Thus, the add-on dies 722 are linearly translatable, parallel to the translational axis of the roller table 209 and axis A (FIGS. 11A-11D). In the working position, the add-on dies 722 are stacked vertically on the first set of horizontal forging dies (See. FIG. 7). Together the first set of horizontal dies 219 and the add-on dies 722 cover the rail head 1018 and substantially the entire web 1017 of a symmetric rail. Thus, the dies 219 and 722 are shaped to form a closed die having the shape of the head 1018 and the full web 1017 of a symmetric rail when the dies 219 and 722 are pressed into the rail. In other words, the add-on dies 722 and the first set of horizontal forging dies 219 cooperate to form part of the geometrical profile of a finished rail section including the head portion of the rail, a first section of the web portion of the rail contiguous with the head portion, and a second section of the web contiguous with the first portion. After the second forging operation, the die 219 and add-on die 722 are opened, and the rail 210 is driven by the roller table 209 along axis A to the second forging station 1102 (FIG. 11D).

With continuing reference to FIG. 11D, the rail 210 is driven to the second forging station 1102 and clamped in three positions by clamps 213, 214, and 215. Specifically, the leading end of the rail is engaged by clamp 215 located in the second forging station 1102, and clamps 213 and 214 engage the rail at their locations in the first forging station 1101. A second set of horizontal forging dies 218 are driven into the rail. The dies 218 are pressed into the head and web portions of the rail, forming a closed die covering the entire geometric profile of the finished symmetric rail except the rail foot 1016. Prior to closing the die, the head 1018 and web 1017 of the rail have already been converted to a symmetric form at the first forging station 1101. The second set of horizontal dies 218 maintain the work piece in a correct form while conducting further forging operations on the foot 1016.

With combined reference to FIGS. 2, 6A, and 11D, the second forging station 1102 (FIG. 11D) includes top hydraulic cylinder 201 (FIGS. 2 and 6A) having a vertical stroke and driving a top die 323 adapted to forge the foot 1016. The top die 323 has two working positions corresponding to two different portions 323a, 323b of the top die 323. The invention is not limited to top dies 323 having first and second portions 323a, 323b as described herein. Rather, two separate dies could be substituted without departing from the scope of the invention. A first portion 323a of the top die 323 is shown in FIGS. 9A-9C having a lateral step 423. The lateral step runs the length of the first portion 323a. The purpose of the lateral step 423 is to provide space into which the foot 1016 can flow, forming bulge 916 (FIG. 9C). The bulge 916 is formed as the first portion 323a of the top die is pressed into the rail foot. Thus, the forging operation shifts the mass of the foot 1016 laterally so that the mass is centered over the web 1017. The top die is then translationally driven by moveable cylinders 221 (FIG. 2) in a direction parallel axis A (see FIGS. 11A-11D) such that the second portion 323b of the top die 323 is positioned over the work piece. As shown in FIG. 9D, the second portion 323b is flat, omitting the lateral step 423. As the second portion 323b is pressed into the foot 1016 by the top cylinder 211, the bulge 916 created by the first portion 323a is flattened as shown in FIG. 9D, thus forming the finished symmetric rail.

The foregoing descriptions of specific embodiments of the present invention have been presented for purposes of illustration and description only, they these are not intended to be exhaustive or to limit the present invention to the precise forms disclosed, and obviously modifications remain possible, in particular from the point of view of the design of the various elements or by substitution of equivalent methods, without thus departing from the scope of protection of the invention.

We claim:

1. An asymmetric to symmetric rail forging press, comprising:

a roller table (209) having one translational axis, the roller table being adapted to receive a railroad rail (210) and translate a railroad rail fore and aft along the one translational axis;

an induction heater (208) adapted to receive an end portion of a railroad rail, the induction heater being laterally movable between a working position in line with a railroad rail, and a home position not in line with the railroad rail;

a first forging station in line with the roller table (209) and adapted to receive a railroad rail therefrom, the first forging station comprising a first pair of opposing horizontal hydraulic cylinders (206a, 206b) having horizontal strokes and driving a first set of horizontal forging dies (219), and a first top hydraulic cylinder (211) having a vertical stroke, the first top hydraulic cylinder being aligned to vertically impinge on the first set of horizontal forging dies during a horizontal forging operation, and the first forging station further including two clamps spaced apart along the length of a railroad rail and adapted to fix the position of a railroad rail during a forging operation;

a second forging station in line with the roller table (209) and adapted to receive a railroad rail from the first forging station, the second forging station comprising, a second pair of opposing horizontal hydraulic cylinders (207a, 207b) having horizontal strokes and driving a second set of horizontal forging dies (218), and a second top hydraulic cylinder (201) having a vertical stroke and driving a top die (323), and the second forging station further including a clamp adapted to receive an end of a railroad rail and fix the position of a railroad rail during a forging operation; and the top die (323) being linearly translatable between two working positions corresponding to a first portion (323a) of the top die and a second portion (323b) of the top die, wherein the first portion (323a) of the top die includes a lateral step (423) running the length of the first portion (323a), and wherein the second portion (323b) of the top die is flat, omitting the lateral step (423).

2. The asymmetric to symmetric rail forging press of claim 1, further comprising add-on dies (722) stackable on the first set of horizontal forging dies (219).

3. The asymmetric to symmetric rail forging press of claim 2, wherein the add-on dies (722) are linearly translatable, parallel to the translational axis of the roller table (209), between a home position spaced apart from the first set of horizontal forging dies (219) and a working position stacked on the first set of horizontal forging dies (219).

4. The asymmetric to symmetric rail forging press of claim 1, wherein the top die (323) and the second set of horizontal forging dies (218) cooperate to form a geometrical profile of a finished rail section.

5. A process for asymmetric to symmetric rail forging comprising the steps of:

mounting a rail to a roller table in line with a first forging station, the roller table being adapted to drive the rail along one translational axis;

positioning an induction heater between the roller table and the first forging station;

driving the rail into inductive communication with the induction heater;

inductively heating the rail to a predetermined forging temperature;

driving the rail to a first forging station;

clamping the rail at ends of a working section of the rail;

pressing a first set of horizontal forging dies into a head portion of the rail and into a first section of the web portion of the rail;

translationally driving a set of add-on dies to a position stacked vertically on the first set of horizontal dies;

pressing the first set of horizontal forging dies and the add-on dies into the head portion of the rail, the first section of the web portion of the rail, and a second section of the web portion of the rail;

driving the rail to a second forging station;

clamping the rail at three points including an end of the rail, a middle portion of the rail and an unworked portion of the rail;

pressing a second set of horizontal forging dies into the head portion and the web portion;

pressing a first portion of a top die, from a first position, into a foot of the rail;

translationally driving the top die from the first position to a second position; and pressing a second portion of the top die into the foot of the rail.

6. The process for asymmetric to symmetric rail forging of claim 5, further comprising the step of withdrawing the rail from the induction heater and sending the induction heater to a home position.

7. The process for asymmetric to symmetric rail forging of claim 5, further comprising the step of retracting the first set of horizontal forging dies after at least one horizontal pressing operation.

8. The process for asymmetric to symmetric rail forging of claim 5, wherein the step of heating the rail to a predetermined forging temperature further comprises heating to 1150° C.+/−10%.

9. The process for asymmetric to symmetric rail forging of claim 5, wherein the step of pressing a first set of horizontal forging dies into a head portion of the rail and into a first section of the web portion of the rail, further comprises the first section being contiguous with the head portion.

10. The process for asymmetric to symmetric rail forging of claim 5, wherein the step of pressing the first set of horizontal forging dies and the add-on dies into the head portion of the rail, the first section of the web portion of the rail, and a second section of the web portion of the rail, further comprises the first section of the web and the second section of the web together being substantially the entire web.

11. The process for asymmetric to symmetric rail forging of claim 5, wherein the first portion (323a) of the top die includes a lateral step (423) running the length of the first portion (323a).

12. The process for asymmetric to symmetric rail forging of claim 11, wherein a portion of the foot flows into a space created by the lateral step.

13. The process for asymmetric to symmetric rail forging of claim 11, wherein the second portion (323b) of the top die is flat, omitting the lateral step (423).

14. The process for asymmetric to symmetric rail forging of claim 13, wherein the foot is centered over the web.

* * * * *